June 28, 1949.   W. R. RAMSAUR   2,474,689
OIL COOLER
Filed Dec. 13, 1944   4 Sheets-Sheet 1

Inventor
WALTER R. RAMSAUR,
Attorney

June 28, 1949.　　　W. R. RAMSAUR　　　2,474,689
OIL COOLER

Filed Dec. 13, 1944　　　　　　　　　　　4 Sheets-Sheet 2

Inventor
WALTER R. RAMSAUR,
By
Attorney

June 28, 1949.  W. R. RAMSAUR  2,474,689
OIL COOLER
Filed Dec. 13, 1944  4 Sheets-Sheet 3
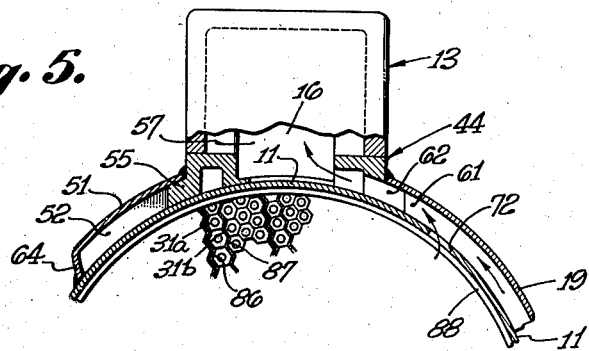
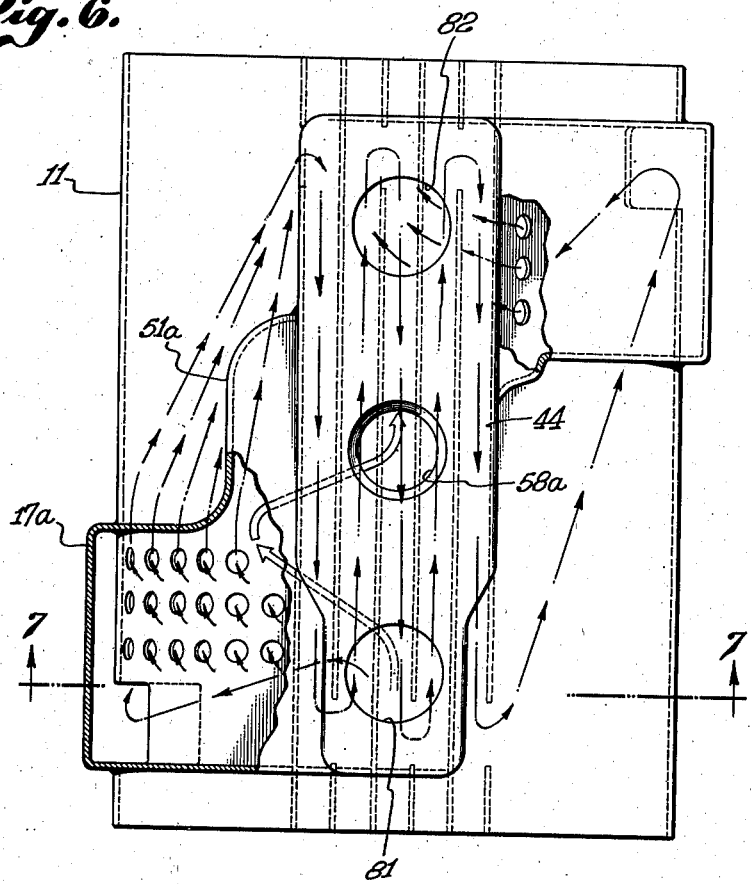
Inventor
WALTER R. RAMSAUR,
By
Attorney June 28, 1949.　　　W. R. RAMSAUR　　　2,474,689
OIL COOLER Filed Dec. 13, 1944　　　4 Sheets-Sheet 4

Inventor
WALTER R. RAMSAUR,
By
Attorney

Patented June 28, 1949

2,474,689

UNITED STATES PATENT OFFICE 2,474,689

OIL COOLER

Walter R. Ramsaur, Los Angeles, Calif., assignor to The Garrett Corporation, Los Angeles, Calif., a corporation of California Application December 13, 1944, Serial No. 568,018

5 Claims. (Cl. 257—128)

1

This invention relates to oil coolers, and has as its general object to provide an oil cooler adapted for use under severe conditions, such as those encountered in use in connection with aircraft, and which is compact, light in weight, and adapted to thaw out quickly from a congealed condition.

One of the primary problems met with in oil coolers for aircraft is the restoration of the proper flow of engine lubricating oil during the warming up of the aircraft after a shut down in extremely low temperatures. During the shut down periods at low temperatures the oil congeals in the cooler and it is necessary to thaw the oil before it can be circulated through the cooler. It has been customary to employ a jacket or muff entirely surrounding the cooler to provide for a circulation of hot oil from the engine for thawing out the cooler. However, with such a muff, providing a relatively unrestricted path for the flow of oil, it is possible for the oil to become so congealed under extremely low temperatures, as to develop high resistance to circulation through the muff, and this creates the problem of making the muff sufficiently heavy to avoid being ruptured under the high pressures which may be developed under such conditions. Workers in the art have therefore constantly sought to improve the thawing characteristics of such oil coolers.

With this general object in mind, the invention contemplates an improved arrangement in an oil cooler of a short bypass from the cooler inlet to the cooler outlet, normally closed but adapted to open so as to maintain the flow when the inlet pressure exceeds a predetermined maximum, said bypass, in addition to its bypassing function, being adapted to function as a means for warming up and thawing congealed oil in the cooler core.

An important object of the invention is to reduce the weight of the cooler by eliminating the conventional warm up jacket or muff and employing an axially extending bypass to provide the warm up area. The reduction in weight results not only from the elimination of the weight of the muff, but also from elimination of the weight of the oil contained therein. To this end, the invention aims to provide a cooler wherein the warm up area is confined to the bypass, and in place of the conventional muff entirely surrounding the full area of the cooler, there is employed a pair of manifolds which provide, respectively, a passage from the main cooler inlet to the inlet port in the core and a passage from the core outlet to the main cooler outlet, and which are restricted to the area necessary to provide such passages.

More specifically, the invention contemplates a cooler arrangement wherein a bypass, arranged in direct heat transfer relation to one side of the oil flow passage in the cooler core, substantially covers the entire area of the flow path on that side, thus employing the bypass rather than a muff as the primary means for providing a warm area covering substantially the full length of the flow path. The invention assures the transfer of heat for de-congealing purposes at all times when needed, even when the oil is bypassing directly from the inlet to the outlet.

Further objects and advantages of the invention will be brought out in the following part of the specification.

Referring to the drawings which are for illustrative purposes only,

Fig. 5 is a detailed transverse sectional view taken on the line 5—5 of Fig. 1 and showing a portion of the outlet passage;

Fig. 6 is a plan view of an oil cooler embodying a modified form of the invention.

Figures 1, 2:
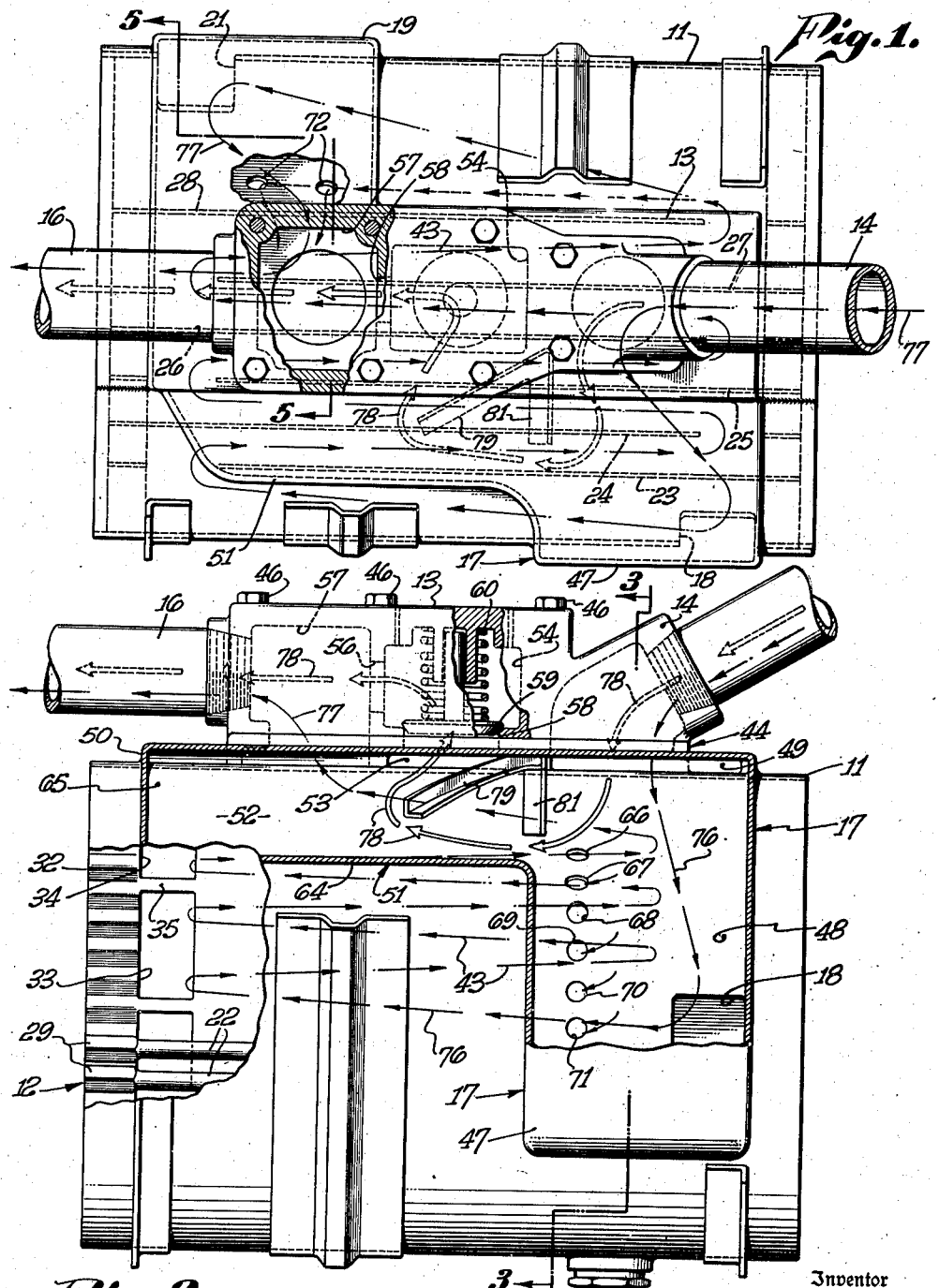
Fig. 1 is a plan view of an aircraft oil cooler embodying the invention, with parts broken away to illustrate the interior structure thereof.
Fig. 2 is a side elevation of the same, likewise broken away to illustrate the interior structure.

As an example of one form in which the invention may be embodied, I have shown in Figs. 1 to 5 inclusive an oil cooler embodying a shell 11 of tubular form, a radiator core 12 therein and a fitting 13 which incorporates an inlet 14 and an outlet 16, secured to the top of the shell in a position extending longitudinally thereof.

The radiator core 12 comprises a plurality of bundles of radiator tubes 22, and a plurality of baffles 23, 24, 25, 26, 27 and 28, separating the respective tube bundles. The tubes 22 are provided with expanded hexagonal ends 29 which are soldered together and to the intervening baffles 23—28 to provide continuous end walls in the respective ends of the cooler enclosing between them the longitudinal spaces 31 through which the oil may flow around and between the tubes 22. The coolant, which ordinarily comprises air, may flow through the tubes 22 so as to extract heat from the oil in the spaces 31 through the walls of the tubes, in the normal operation of the cooler.

The baffles 23—28 are corrugated as indicated at 32 in Fig. 2 to the proper shape to fit between the hexagonal ends 29 of the tubes 22. Each baffle is provided, near one end thereof, with a series of apertures 33 and 34 separated by webs 35. These apertures are located at opposite ends in the alternate baffles, so as to provide for the flow of oil from the inlet port 18, back and forth from end to end of the cooler through a tortuous path including the longitudinal compartments 36, 37, 38, 39, 40, 41, and 42, to the outlet port 21. This tortuous path is indicated by the arrows 43 in Fig. 4.

The fitting 13 is attached to a mating fitting 44 by means of bolts 46, the fitting 44 in turn being welded to the shell 11 and cooperating with a sheet metal jacket member 17 which also is welded to the shell 11. The jacket member 17 includes a circumferential arm 47 which cooperates with the shell to define an inlet passage 48 extending from a port 49 in the left side of the fitting 44 (as viewed in Fig. 3) to the inlet port 18 in the shell 11. The jacket member 17 further includes a longitudinal arm 51 which is welded to the shell 11 at one side thereof and to the fitting 44 on its other side to form, together with the shell 11 and the fitting 44, the main portion 52 of the bypass passage and warm up chamber. From the portion 52, the bypass is continued through a port 53 in the left side of the fitting 44 (as viewed in Fig. 3) into a bypass valve chamber 54 in the fitting 13 and thence through a port 56 into the outlet chamber 57 in the fitting 13. Between the port 53 and the chamber 54 is a valve port 58 which is normally closed by a valve 59 under the yielding pressure of a spring 60. The portion 52 of the bypass is substantially coextensive in length with the fitting so as to provide a warm up chamber extending the full length of the oil circulation spaces 31, but the left end of the portion 52 is separated from the outlet chamber 57 by the left wall 55 of the latter (as viewed in Fig. 5) which extends to the shell 11. Thus the left end of the space 52 forms a pocket 65 in which the bypassing oil may circulate, but from which it must return to the port 53 in its path through the bypass.

An outlet channel 19 is welded to the shell 11 and to the fitting 44 to provide an outlet passage 61 extending from the outlet port 21 to the chamber 57 through a port 62 in the right hand side of the fitting 44 (as viewed in Fig. 5).

The internal construction of the fittings 13 and 44 is substantially the same as that disclosed in my earlier application, Serial No. 383,731, filed March 17, 1941, for Letters Patent on a High capacity oil cooler, and reference is made to that application for a more complete showing of such construction.

Figure 3:
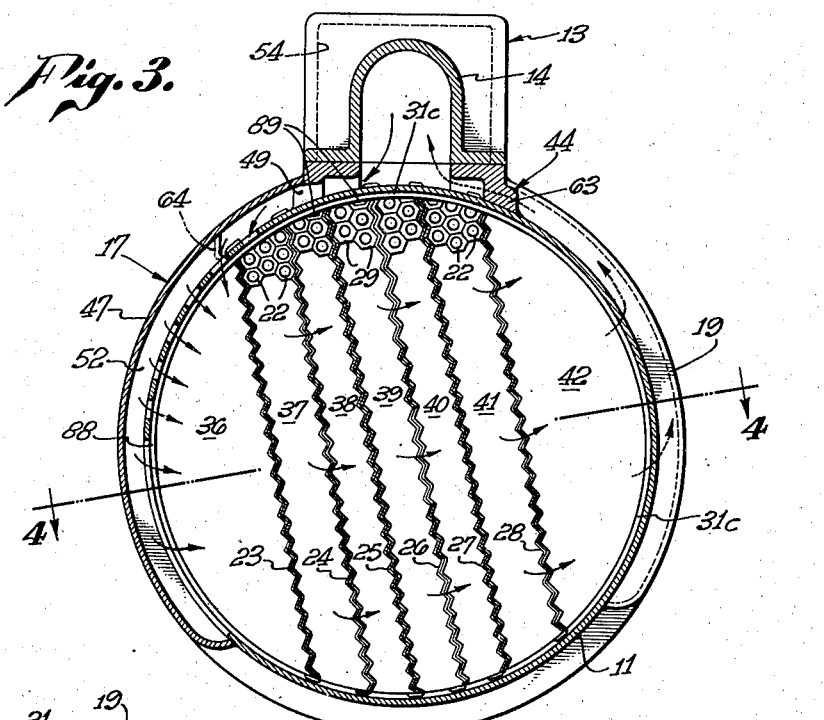
Fig. 3 is a transverse sectional view of the same taken on the line 3—3 of Fig. 2.
Figure 4:
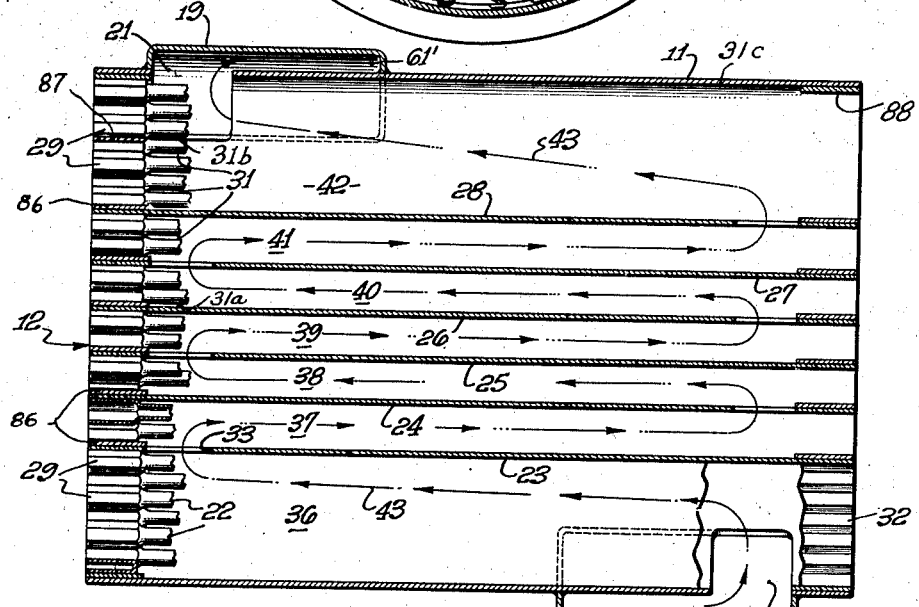
Fig. 4 is a longitudinal sectional view of the same taken on the line 4—4 of Fig. 3.

In accordance with the present invention, the baffles 23—28 are arranged so that their upper edges join the shell 11 in an area extending longitudinally of the cooler and somewhat restricted circumferentially, so that said area may correspond generally to the area covered by the bypass. The effective area of the bypass, as a warm up space, may be considered to include all of the area extending from the rightward wall 63 of the fitting 44 to the leftward wall 64 of the muff arm 51 and extending from end to end of the fitting 44. As shown in Fig. 3, this warm up area covers one side of all of the compartments 37—41 inclusive of the core flow path, only the terminal compartments 36 and 42 being excluded from the coverage by the warm up area. The upper extremities of these latter compartments will, however, be heated by conduction from the immediately adjacent warm up area. In order that the upper extremities of the compartments 37—41 may be properly related in this manner to the warm up area, the baffles 23—28 are spaced more closely together in the central region of the cooler than at the sides and are inclined so as to subtend a small dihedral angle with reference to the axial vertical plane of the cooler passing through the inlet 14 and outlet 16. The progressively wider spacing of the baffles from the center toward the sides also has the effect of rendering the cross sectional area of the compartments 36—42 substantially uniform so as to obtain maximum efficiency of utilization of the available space within the core for the provision of an oil flow path adapted to handle a maximum flow of oil.

Due to the close association of the upper side of the oil flow path with the warm up area throughout substantially its entire length, the initial flow of hot oil through the bypass in a congealed cooler will quickly thaw the oil in the upper regions of the compartments 36—42 so as to provide an initial de-congealing oil flow path throughout the major portion of the length of the main oil flow path. Access to this de-congealing path from the inlet 14 may be provided by the flowing of the oil in the passage 48 down to the inlet port 18, which will be effected quite rapidly due to the fairly large cross sectional area of the passage 48. However, the invention contemplates speeding up the opening of a path from the inlet 14 to the de-congealing path by providing substantially immediate access to the de-congealing path from the bypass. To this end, I provide a plurality of bleed ports 66, 67, 68, 69, 70, and 71 in the shell 11, arranged generally in a line extending from within the bypass to a point near the inlet port 18. To further facilitate opening the de-congealing path for the initial flow of oil therethrough, a bleed port, or ports, 72, may be incorporated in the shell 11 in communication with the outlet passage 61 near the port 62 so as to provide a direct outlet from the extreme upper extremity of the compartment 42 into the outlet chamber 57.

In the operation of the cooler, the normal flow is from the inlet 14 through the port 49 into the inlet passage 48, as indicated by the dot-and-dash line 76, thence in the tortuous flow path 43 through the compartments 36, 37, 38, 39, 40, 41, and 42 in the order named, within the radiator core, then through the outlet port 21, the outlet passage 61, the port 62, the outlet chamber 57 in the fitting 13, and to the outlet 16, as indicated by the dot and dash arrows 77. During its zigzag flow through the path 43 within the radiator core, the oil is cooled by the absorption of heat therefrom through the walls of the tubes 22 by a coolant, such as air, passing through the tubes 22 from end to end of the cooler.

When the oil is thus freely circulating through the cooler, the bypass valve 59 will remain closed under the pressure of the spring 60. When the oil in the cooler has become congealed, however, the initial flow of hot oil from the engine will, because of the resistance offered by the normal flow path, build up a pressure in the bypass sufficient to raise the valve 59 and permit the oil to bypass directly to the outlet 16 through the bypass, as indicated by the heavy arrows 78. In order to divert the bypass flow as much as possible into the dead end warming pocket 65, there is provided opposite the port 53 a pair of deflector members 79 and 81 which may be strips of angle iron welded to the shell 11. This flow of hot oil through the bypass will quickly warm the area of the shell 11 immediately over the upper side of the tortuous flow path 43 so as to thaw the oil in said path immediately adjacent the shell 11. At the same time, the pressure built up in the bypassing oil by the resistance of the spring 60 will urge the hot oil to pass through the bleed port 66 into the beginning end of the de-congealing path (the upper region of the compartment 36). The oil thus flowing through the bleed port 66 will cause the shallow body of de-congealed oil in the initial flow path to start flowing to the outlet bleed ports 72 and thence to the outlet 16, thus establishing an initial small volume circulation of thawed oil in the initial flow path. This initial circulation of oil will exert a sluicing action against the deeper layers of congealed oil in the main flow path 43, gradually deepening the opened portion of the flow path. At the same time the thawing action in the bypass will spread downwardly into the inlet passage 48 and toward the inlet port 18, successively opening the bleed ports 67, 68, 69, 70, and 71. As each of these ports is successively uncovered, the circulation of oil through the initial flow path will be speeded up and the pressure in the bypass will be gradually lowered. In response to this lowering pressure the valve 59 will move toward its closed position, gradually throttling off the bypass flow in proportion to the increased flow through the core. Thus the thawing out will be accelerated until the congealed oil is completely thawed and sluiced out of the radiator core, the bypass closed off by the valve 59, and the full normal flow from the inlet port 18 to the outlet port 21 is established.

Figure 7:
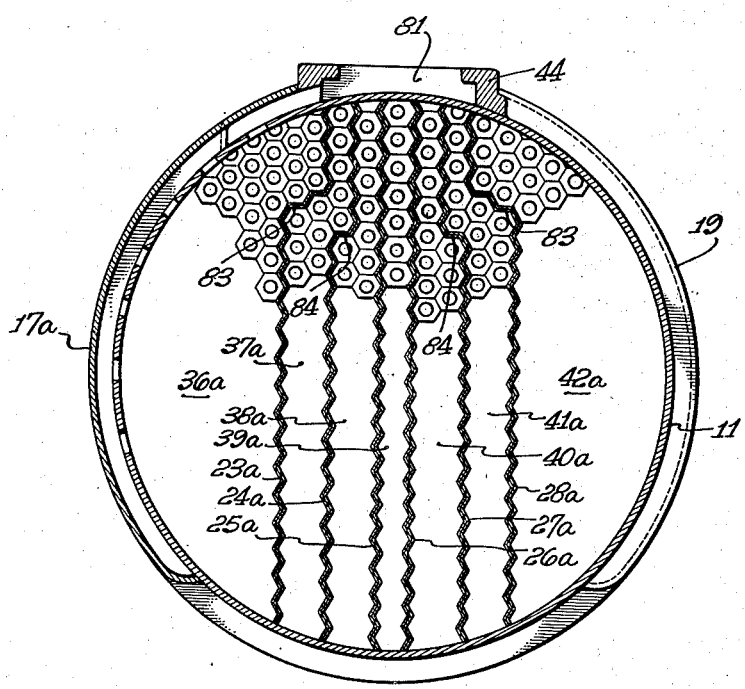
Fig. 7 is a transverse sectional view of the same taken on the line 7—7 of Fig. 6.

In the alternative form of the invention, shown in Figs. 6 and 7, the principles of arrangement and construction described above are embodied, and the same reference numerals are used to designate the same, with the exception of the arrangement of the baffles 23a, 24a, 25a, 26a, 27a, and 28a in symmetrical relation to the vertical axial plane of the cooler passing through the inlet and outlet openings 81 and 82 (of the fitting 44) and the restriction of the bypass area to substantially the area of the fitting 44, the longitudinal arm 51a of the muff 17a being just sufficiently large to establish the bypass flow between the inlet opening 81 and the bypass valve port 58a. The upper extremities of the flow compartments 36a, 37a, 38a, 39a, 40a, 41a and 42a are narrowed down so that all except the terminal compartments 36a and 42a are covered by the fitting 44 and thus in direct heat transfer association with the warm up bypass area. In order to make this possible, and at the same time to properly distribute the cross sectional area of the cooler core between these compartments so that the cross sectional area of all compartments may be substantially uniform, the outer pairs of baffles 23a, 28a, and 24a, 27a, respectively are offset as at 83 and 84 respectively from the plane of symmetry of the entire group of baffles, thus widening the compartments 36a, 37a, 38a, 40a, 41a, and 42a in their lower regions.

At this point it may be noted that, for the purpose of clarity and detailed showing of the tubes 22, they are illustrated in much larger proportion to the size of the cooler than the actual proportions employed in the construction of coolers in accordance with the invention. For example, in the central compartment 39 of Figs. 3 and 4, only two tiers of tubes are shown, whereas in actual practice four or five of such tiers may be employed, as shown in Fig. 5. One of these tiers, for example, a tier adjacent one of the baffles, may, by use of spacing strips 86 and 87, be spaced from the baffle and from the adjacent tier of tubes by oil flow spaces 31a and 31b respectively, which are wider than the rest of the oil flow spaces 31 so as to facilitate the sluicing action of the hot oil in the initial de-congealing flow path, and speed up the clearing of the remainder of the normal flow paths. The strips 86 and 87 are soldered between the hexagonal tube ends and between the latter and the baffles respectively. In a similar manner, the extremities of the compartments 36—42 adjacent the shell 11 may be provided with enlarged flow spaces 31c, Fig. 3, between the tubes 22 and the shell 11, through the use of a spacer ring 88 between the shell and the hexagonal tube ends, and short semi-hexagonal filler plugs 89 interposed between the ring 88 and alternate hexagonal heads 29.

I claim as my invention:

1. An oil cooler comprising a shell, a radiator core within said shell comprising tubes extending longitudinally of said shell, inlet and outlet ports in said shell, baffles extending longitudinally of said shell in spaced side by side relationship dividing said cooler into parallel longitudinally extending compartments, there being communicating openings between said compartments adjacent the ends of said baffles and adjacent said shell, said openings being disposed alternately at opposite ends of the cooler to form a tortuous oil flow channel from said inlet port back and forth longitudinally of said core to said outlet port with at least one side edge of said channel being formed by the interior surface of said shell, walls cooperating with the exterior surface of said shell to define a chamber exteriorly of said shell provided with a cooler inlet in communication with said inlet port and a cooler outlet in communication with said outlet port, said chamber forming a bypass exteriorly of said shell which extends from said cooler inlet to said cooler outlet and being of such extent peripherally of said shell as to substantially overlie one side edge only of each of said baffles to concentrate the transfer of heat from hot oil flowing through said bypass to one side edge only of said oil flow channel to rapidly decongeal oil along said one side edge of said flow channel.

2. An oil cooler as defined in claim 1 having a valve which closes said bypass when resistance to flow of oil through said core is reduced to a predetermined value.

3. An oil cooler comprising a shell, a radiator core within said shell comprising tubes extending longitudinally of said shell, inlet and outlet ports in said shell, baffles extending longitudinally of said shell in spaced side by side relationship dividing said cooler into parallel longitudinally extending compartments, there being communicating openings between said compartments adjacent the ends of said baffles and adjacent said shell, said openings being disposed alternately at opposite ends of the cooler to form a tortuous oil flow channel from said inlet port back and forth longitudinally of said core to said outlet port with at least one side edge of said channel being formed by the interior surface of said shell, walls defining a chamber exteriorly of said shell provided with a cooler inlet in communication with said inlet port and a cooler outlet in communication with said outlet port, said chamber extending from said cooler inlet to said cooler outlet and being of such extent peripherally of said shell as to substantially overlie one side edge only of each of said baffles to concentrate the transfer of heat from hot oil flowing through said chamber to one side edge only of said oil flow channel to rapidly decongeal oil along said one side edge of said flow channel.

4. An oil cooler comprising a shell, a radiator core within said shell comprising tubes extending longitudinally of said shell, inlet and outlet ports in said shell, baffles extending longitudinally of said shell in spaced side by side relationship dividing said cooler into parallel longitudinally extending compartments, there being communicating openings between said compartments adjacent the ends of said baffles and adjacent said shell, said openings being disposed alternately at opposite ends of the cooler to form a tortuous oil flow channel from said inlet port back and forth longitudinally of said core to said outlet port with at least one side edge of said channel being formed by the interior surface of said shell, a jacket extending longitudinally of the exterior of said shell and being of such extent peripherally of said shell as to substantially overlie one side edge only of each of said baffles, said jacket being provided with a cooler inlet in communication with said inlet port and a cooler outlet in communication with said outlet port, said jacket forming with said shell a bypass exteriorly of said shell which extends longitudinally of the cooler from said cooler inlet to said cooler outlet in substantially overlying relationship to one side edge only of said oil flow channel to concentrate the transfer of heat from hot oil flowing through said bypass to said one side edge only of said oil flow channel to rapidly decongeal oil along said one side edge of said flow channel.

5. An oil cooler comprising a shell, a radiator core within said shell, inlet and outlet ports in said shell, baffles extending longitudinally of said shell in spaced side by side relationship dividing said cooler into parallel longitudinally extending compartments, there being communicating openings between said compartments adjacent the ends of said baffles and adjacent said shell, said openings being disposed alternately the opposite ends of the cooler to form a tortuous oil flow channel from said inlet port back and forth longitudinally of said core to said outlet port with at least one side edge of said channel being formed by the interior surface of said shell, walls cooperating with the exterior surface of said shell to define a chamber exteriorly of said shell, walls forming an oil cooler inlet through which oil may flow to said chamber and to said inlet port and forming an oil cooler outlet through which oil may flow from said chamber and from said outlet port, a deflector positioned in said chamber around which hot oil must flow in passing through said chamber, said chamber being of such extent peripherally of said shell as to substantially overlie one side edge only of each of said baffles to concentrate the transfer of heat from oil flowing through said bypass to one side edge only of said oil flow channel to rapidly decongeal oil along said one side edge of said flow channel.

WALTER R. RAMSAUR.

REFERENCES CITED

The following references are of record in the file of this patent:

UNITED STATES PATENTS

| Number | Name | Date |
|---|---|---|
| 1,776,726 | Gross | Sept. 23, 1930 |
| 2,159,468 | Young et al. | May 23, 1939 |
| 2,223,662 | Lear | Dec. 3, 1940 |
| 2,307,300 | Ramsaur | Jan. 5, 1943 |
| 2,343,868 | Dykeman et al. | Mar. 14, 1944 |
| 2,373,157 | Worth | Apr. 10, 1945 |
| 2,387,485 | Young et al. | Oct. 23, 1945 |

FOREIGN PATENTS

| Number | Country | Date |
|---|---|---|
| 522,740 | Great Britain | June 26, 1940 |